(12) United States Patent
Umeda et al.

(10) Patent No.: US 7,469,231 B2
(45) Date of Patent: Dec. 23, 2008

(54) DIGITAL CONTENTS AND SYSTEM FOR RECEIVING ORDER FOR PRINTS

(76) Inventors: Tomoaki Umeda, c/o Fuji Photo Film Co., Ltd., 798 Miyanodai, Kaisei-machi, Ashigarakami-gun, Kanagawa-ken (JP); Takeshi Katayama, c/o Fuji Photo Film Co., Ltd., 798 Miyanodai, Kaisei-machi, Ashigarakami-gun, Kanagawa-ken (JP)

( * ) Notice: Subject to any disclaimer, the term of this patent is extended or adjusted under 35 U.S.C. 154(b) by 956 days.

(21) Appl. No.: 10/206,863

(22) Filed: Jul. 29, 2002

(65) Prior Publication Data

US 2003/0041034 A1   Feb. 27, 2003

(30) Foreign Application Priority Data

Jul. 30, 2001   (JP) ............... 2001-229745

(51) Int. Cl.
*G06F 17/60* (2006.01)

(52) U.S. Cl. ............... 705/64; 705/1; 705/50; 348/231.2; 348/231.3

(58) Field of Classification Search ............ 705/1, 705/51, 50, 64; 348/231.2, 231.3
See application file for complete search history.

(56) References Cited

U.S. PATENT DOCUMENTS

| | | | |
|---|---|---|---|
| 5,760,917 A * | 6/1998 | Sheridan | 358/442 |
| 6,301,660 B1 * | 10/2001 | Benson | 713/165 |
| 6,504,620 B1 | 1/2003 | Kinjo | |
| 6,886,017 B1 * | 4/2005 | Jackson et al. | 707/104.1 |
| 7,057,648 B2 * | 6/2006 | Parulski et al. | 348/231.2 |
| 2003/0069853 A1 * | 4/2003 | Bryant | 705/59 |

FOREIGN PATENT DOCUMENTS

| | | |
|---|---|---|
| JP | 10-269286 A | 10/1998 |
| JP | 2000-324096 A | 11/2000 |
| JP | 2001-147899 A | 5/2001 |

* cited by examiner

*Primary Examiner*—Andrew J. Fischer
*Assistant Examiner*—John Winter

(57) ABSTRACT

A digital contents set includes encoded low-resolution digital contents obtained by encoding low-resolution digital contents by a first public key, and encoded high-resolution digital contents obtained by encoding high-resolution digital contents by a second public key.

24 Claims, 10 Drawing Sheets

DIGITAL CONTENTS AND SYSTEM FOR RECEIVING ORDER FOR PRINTS

BACKGROUND OF THE INVENTION

1. Field of the Invention

This invention relates to digital contents for use when an user makes an order for prints and a system for receiving orders for prints.

2. Description of the Related Art

There have been put into practice various digital photo service systems such as those which; digitize pictures taken by users and store the digitized image data representing the pictures in an image server; digitize pictures taken by users, record the digitized image data representing the pictures on a CD-ROM and provide the CD-ROM to the user, and take orders for more prints. As a kind of such digital photo service systems, there has been known a network photo service system which receives order for various photo services like orders for prints by way a network, e.g., internet.

Further there has been put into practice a digital photo service in which template data representing layout of letters and a specific character is provided to users and postcards, greeting cards, or anniversary cards are printed on the basis of image data obtained by combining with the template data user's image data such as image data stored in a CR-ROM or image data representing a picture taken by the user with a digital camera or the like.

Generally, digital contents representing characters or pictures of TV talents are copyrighted, and when such copyrighted digital contents are used, a copyright royalty must be paid to the copyright holders.

Accordingly, it is not desirable to deliver copyrighted digital contents or combined image data including such copyrighted digital contents to the user in that the copyrighted digital contents can be illegally used without payment of the copyright royalty.

SUMMARY OF THE INVENTION

In view of the foregoing observations and description, the primary object of the present invention is to provide digital contents for use when an user makes an order for prints and a system for receiving orders for prints which can prevent illegal use of copyrighted digital contents and make it feasible to properly collect the copyright royalty.

In accordance with a first aspect of the present invention, there is provided a digital contents set comprising encoded low-resolution digital contents obtained by encoding low-resolution digital contents by a first public key, and encoded high-resolution digital contents obtained by encoding high-resolution digital contents by a second public key.

The term "digital contents" as used here means digital image data representing, for instance, a photo, an illustration or a template for making postcards.

The term "low-resolution digital contents" as used here means digital image data on the basis of which an image is displayed, combined or printed by a user terminal when a user makes an order, and the term "high-resolution digital contents" as used here means high-quality digital image data on the basis of which, for instance, a service shop prints for users.

Accordingly, the low-resolution digital contents need not be necessarily lower in resolution than the high-resolution digital contents, and the low-resolution digital contents may be those obtained by representing the high-resolution digital contents in black and white or by adding letters, for instance, "sample" to the image data.

Further, the low-resolution digital contents and the high-resolution digital contents need not be each one. For example, the low-resolution digital contents may comprise a plurality of pieces of digital image data such as data for display and data for proofing.

The digital contents set may include data other than the low-resolution digital contents and the high-resolution digital contents, for instance, may include thumb nail image data for displaying small the contents of the image data on the user terminal.

The "public key" is an encoding key used in the public key cryptosystem such as RSA system where encoding and decoding are effected by different keys.

In accordance with a second aspect of the present invention, there is provided a digital contents set comprising encoded low-resolution digital contents obtained by encoding low-resolution digital contents by a first common key, a first encoded common key obtained by encoding the first common key by a first public key, encoded high-resolution digital contents obtained by encoding high-resolution digital contents by a second common key and a second encoded common key obtained by encoding the second common key by a second public key.

The "common key" is an encryption key used in the conventional encryption system such as DES (Data Encryption Standard) system where encoding and decoding are effected by one key.

In accordance with a third aspect of the present invention, there is provided a system for receiving orders for prints from a user holding user's image data, in which a digital contents set in accordance with a first or second aspect of the present invention, a first personal key corresponding to the first public key, a second personal key corresponding to the second public key and a third public key are distributed to users, a third personal key corresponding to the third public key is distributed to a service shop for printing the digital contents, a user who want to make an order for prints makes by a user terminal combined image data by combining the user's image data with the low resolution digital contents decoded by the first personal key, the user terminal is caused to make encoded output data by encoding by the third public key output data obtained by combining the user's image data with the high resolution digital contents decoded by the second personal key in the same manner as in making the combined image data, the user transfers the encoded output data as well as an order for prints to the service shop, and the service shop prints the output data encoded by the third personal key.

The "personal key" is a decoding key for decoding data encoded by the public key in the public key cryptosystem. In accordance with the present invention, it is preferred that the personal keys be distributed to users or service shops in a encoded state so that the personal key itself is kept unknown to the user or the service shop even when the user or the service shop uses the personal key. For example, it can be realized by the use of DDSA (Digital Document Security Architecture) developed by FUJI XEROX INC.

The expression "to decode by the personal key" means that when decoding the encoded digital contents encoded by the public key included in the digital contents set in accordance with the first aspect of the present invention, the digital contents are decoded by the personal key and when decoding the encoded digital contents encoded by the common key included in the digital contents set in accordance with the second aspect of the present invention, the encoded common key is first decoded by the personal key and the digital contents are decoded by the decoded common key.

In accordance with a fourth aspect of the present invention, there is provided a system for receiving orders for prints from a user holding user's image data, in which a digital contents set in accordance with a first or second aspect of the present invention, and a first personal key corresponding to the first public key are distributed to users, a second personal key corresponding to the second public key is distributed to a service shop for printing the digital contents, a user who want to make an order for prints makes by a user terminal combined image data by combining the user's image data with the low resolution digital contents decoded by the first personal key, the user terminal is caused to make combination information, on the basis of which the high resolution digital contents are to be combined with the user's image data, on the basis of making the combined image data, the user transfers the user's image data, the encoded high resolution digital contents and the combination information as well as an order for prints to the service shop, and the service shop makes output data by combining the user's image data with the high resolution digital contents decoded by the second personal key on the basis of the combination information and prints the output data thus made.

The "combination information" as used here includes, for instance, information necessary for identifying the template to be combined with the user's image data (e.g., the template number), the layout of images, the sizes of the images, the rates of enlargement of the images and the letters to be input.

In accordance with a fifth aspect of the present invention, there is provided a system for receiving orders for prints from a user holding user's image data, in which the encoded low resolution digital contents of a digital contents set in accordance with a first or second aspect of the present invention and a first personal key corresponding to the first public key are distributed to users, the encoded high resolution digital contents of a digital contents set in accordance with a first or second aspect of the present invention and a second personal key corresponding to the second public key are distributed to a service shop for printing the digital contents, a user who want to make an order for prints makes by a user terminal combined image data by combining the user's image data with the low resolution digital contents decoded by the first personal key, the user terminal is caused to make combination information, on the basis of which the high resolution digital contents are to be combined with the user's image data, on the basis of making the combined image data, the user transfers the user's image data and the combination information as well as an order for prints to the service shop, and the service shop makes output data by combining the user's image data with the high resolution digital contents decoded by the second personal key on the basis of the combination information and prints the output data thus made.

In accordance with a sixth aspect of the present invention, there is provided a system for receiving orders for prints from a user holding user's image data, in which a third personal key corresponding to a third public key is distributed to a service shop for printing the digital contents, a user who want to make an order for prints connects his or her user terminal by way of a network to an order receipt server which has been provided with a digital contents set in accordance with a first or second aspect of the present invention, a first personal key corresponding to the first public key, a second personal key corresponding to the second public key, and a third public key and transfers the user's image data to the order receipt server, the order receipt server displays, on the user terminal of the user, the low resolution digital contents decoded by the first personal key, causes the user to send to the server combination information on the basis of which the high resolution digital contents are to be combined with the user's image data viewing a display on his or her user terminal representing the decoded low resolution digital contents, and makes combined image data by combining the user's image data with the decoded low resolution digital contents according to the combination information, the user sends an order for prints to the order receipt server viewing the combined image data displayed on his or her user terminal, the order receipt server makes output data by combining the user's image data with the high resolution digital contents decoded by the second personal key on the basis of the combination information and the order for prints and transfers the output data encoded by the third public key to the service shop, and the service shop prints the output data decoded by the third personal key.

The "order receipt server" is a server computer installed, for instance, a digital photo service center for receiving orders for prints. In the case where the digital photo service center has a printer, the order receipt server is directly connected to the printer, and in the case where the digital photo service center has no printer, the order receipt server is connected to a printer server installed in a service shop such as a large scale laboratory or a mini laboratory by way of a network. Such a service shop also functions as a shop for delivery of finished products.

In the systems in accordance with the third to sixth aspects of the present invention, the first personal key, the second personal key and/or the third personal key may be arranged to be available only for a limited time or to be available only when used in combination with an ID data for identifying the user's hardware or software.

Further, in the systems in accordance with the third to sixth aspects of the present invention, accounting may be made on the service shop on the basis of the number of the high resolution digital contents or the output data printed in the service shop or on the user each time the user gets the digital contents set.

The program loaded in a user terminal to conform the user terminal to the system in accordance with the third aspect of the present invention causes the user terminal to perform the steps of decoding the encoded low resolution digital contents by the first personal key, causing the user to make combined image data by combining the decoded low resolution digital contents with the user's image data, decoding the encoded high resolution digital contents by the second personal key, making output data by combining the decoded high resolution digital contents with the user's image data in the same manner as making the combined image data, and making encoded output data by encoding the output data by the third public key.

The program may be loaded in the user terminal recorded on a computer-readable medium. A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

When the digital contents set in accordance with the first or second aspect of the present invention are used in the system in accordance with the third to sixth aspects of the present invention, an illegal use of copyrighted high resolution digital contents can be effectively prevented.

In the system in accordance with the third aspect of the present invention, since the user is caused to make an order for prints by using only the low resolution digital contents, an illegal use and a drain on the high resolution digital contents can be prevented. Further, by making accounting when the user gets the digital contents set or when the service shop prints the digital contents set, the copyright royalty can be properly collected.

In the system in accordance with the fourth aspect of the present invention, an effect similar to that obtained in the system of the third aspect of the present invention can be obtained and at the same time, security is further enhanced as compared with the system in accordance with the third aspect of the present invention since the high resolution digital contents are not decoded by the user terminal.

In the system in accordance with the fifth or sixth aspect of the present invention, an effect similar to that obtained in the system of the third aspect of the present invention can be obtained and at the same time, security is further enhanced as compared with the system in accordance with the third or fourth aspect of the present invention since the high resolution digital contents are not distributed to the user.

DESCRIPTION OF THE PREFERRED EMBODIMENTS

A digital photo service system, a print order receipt system (a system for receiving orders for prints) in accordance with an embodiment of the present invention, will be described with reference to the drawings, hereinbelow. In this particular embodiment, the display template data and the proofing template data correspond to "low resolution digital contents" as mentioned in claims, and the output template data corresponds to "high resolution digital contents" as mentioned in claims. That is, the template data set including the display template data, the proofing template data and the output template data corresponds to "digital contents set" as mentioned in claims. The digital contents set may include any digital image data without limiting to such template data.

Figure 1:
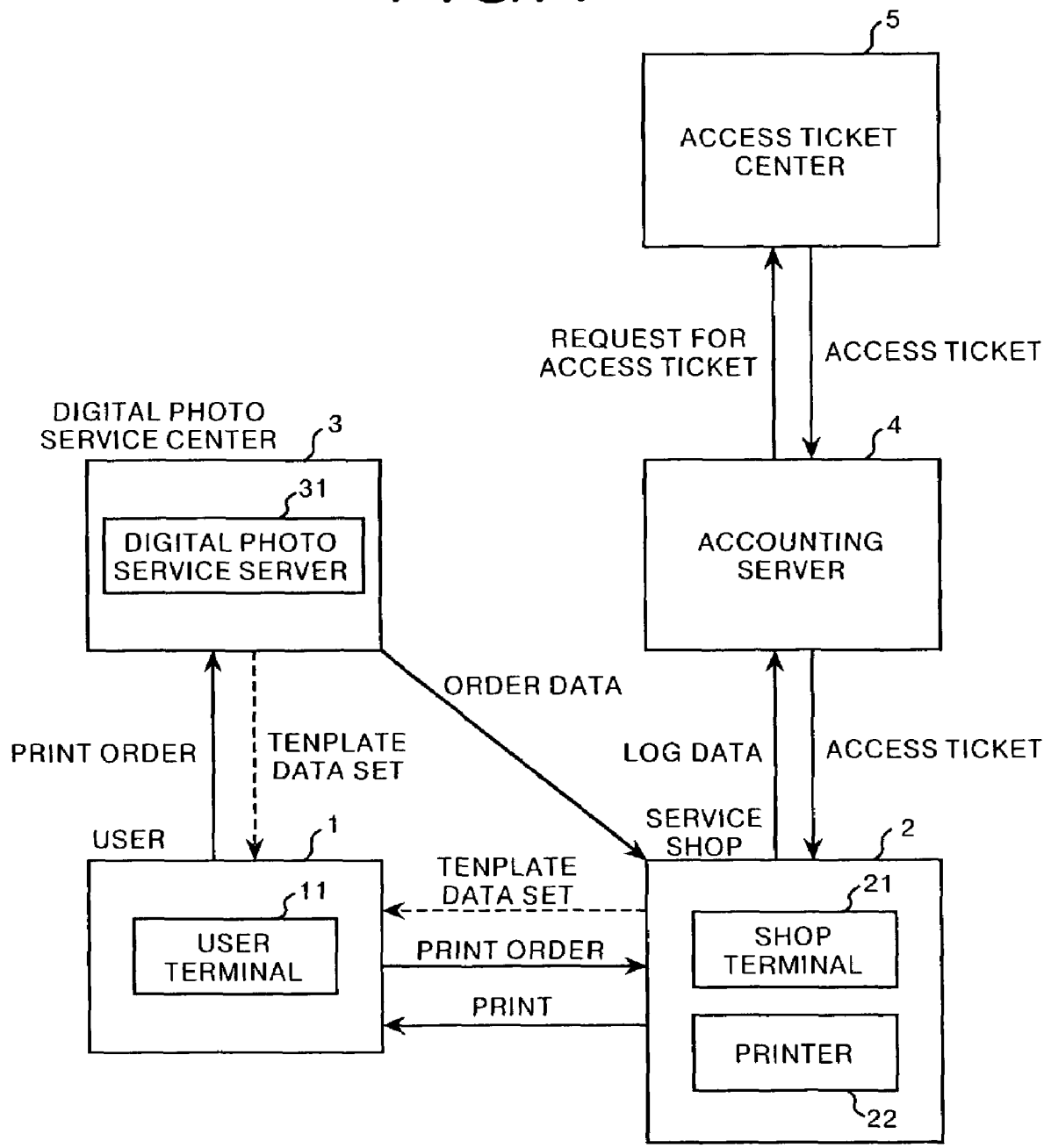
FIG. 1 is a schematic block diagram showing a digital photo service system, a print order receipt system (a system for receiving orders for prints) in accordance with an embodiment of the present invention is applied.
Figure 2:
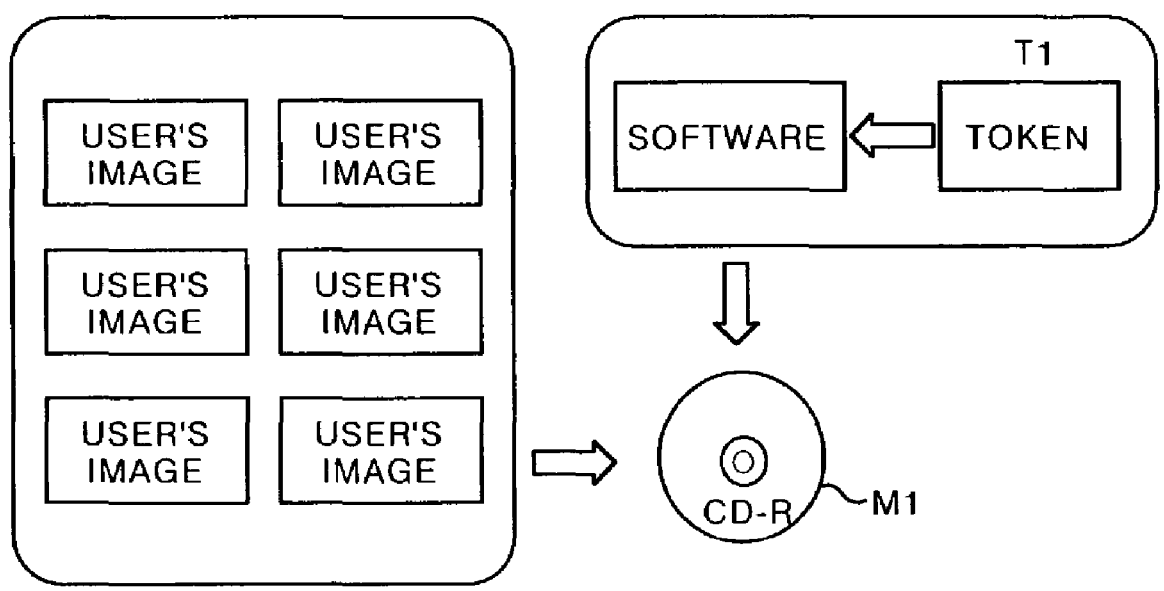
FIG. 2 is a view for illustrating a CD-R on which user's image data and software are recorded.

In the digital photo service system shown in FIG. 1, image data such as template data, prints and the like are transferred between a user 1 and a service shop 2 and an accounting server 4 makes accounting on the service shop 2. It is possible for a photo service center 3 to send a template data set to the user 1. An access ticket center 5 issues access tickets (to be described later) as requested by the accounting server 4.

The access ticket is for trusting the function of the personal key to those other than the owner of the personal key with the personal key itself kept unknown to the trustee. The access ticket includes therein an encoded personal key and can function as the personal key when combined with a token to be described later with the personal key itself kept unknown to the trustee. This arrangement has been put into practice as DDSA (Digital Document Security Architecture) by FUJI XEROX INC.

The user 1 has a user terminal 11 which may be, for instance, a personal computer, and can combine images by predetermined software and make an order for prints to the service shop 2. When the user 1 has no own user terminal 11, the user can use a shop terminal 21 installed in the service shop 2 or the like in place of the user terminal 11.

The service shop 2 has a shop terminal 21 and a printer 22, and is provided in advance with an output data access ticket R3T2 and a token T2 to be described later.

The digital photo service center 3 has a digital photo service server 31 connected to the user terminal 11 by way of a network (not shown).

The operation of the digital photo service system of this embodiment will be described, hereinbelow. First the user 1 prepares user's image data. The user's image data may be image data which the user obtains by a digital camera or that obtained by digitizing an image recorded on a photographic film and recording the digitized image data on a recording medium such as a CD-R.

The software for combining the user's image data and template data is sent to the user 1. This software includes a token T1 which is an identification data for identifying hardware or software to be used. The software may be delivered to the user 1 by recording it on a recording medium such as a CD-R when recording digitized image data representing an image on a photographic film which the user 1 takes in the service shop 2 or by way of the network when the user 1 logs onto the digital photo service server 31.

Then a template data set, a low resolution data access ticket R1T1 and a high resolution data access ticket R2T1 are sent to the user 1. They may be delivered to the user 1 by the service shop 2 distributing a recording medium such as a CD-ROM to the user 1 or by way of the network when the user 1 logs onto the digital photo service server 31.

Figure 3:
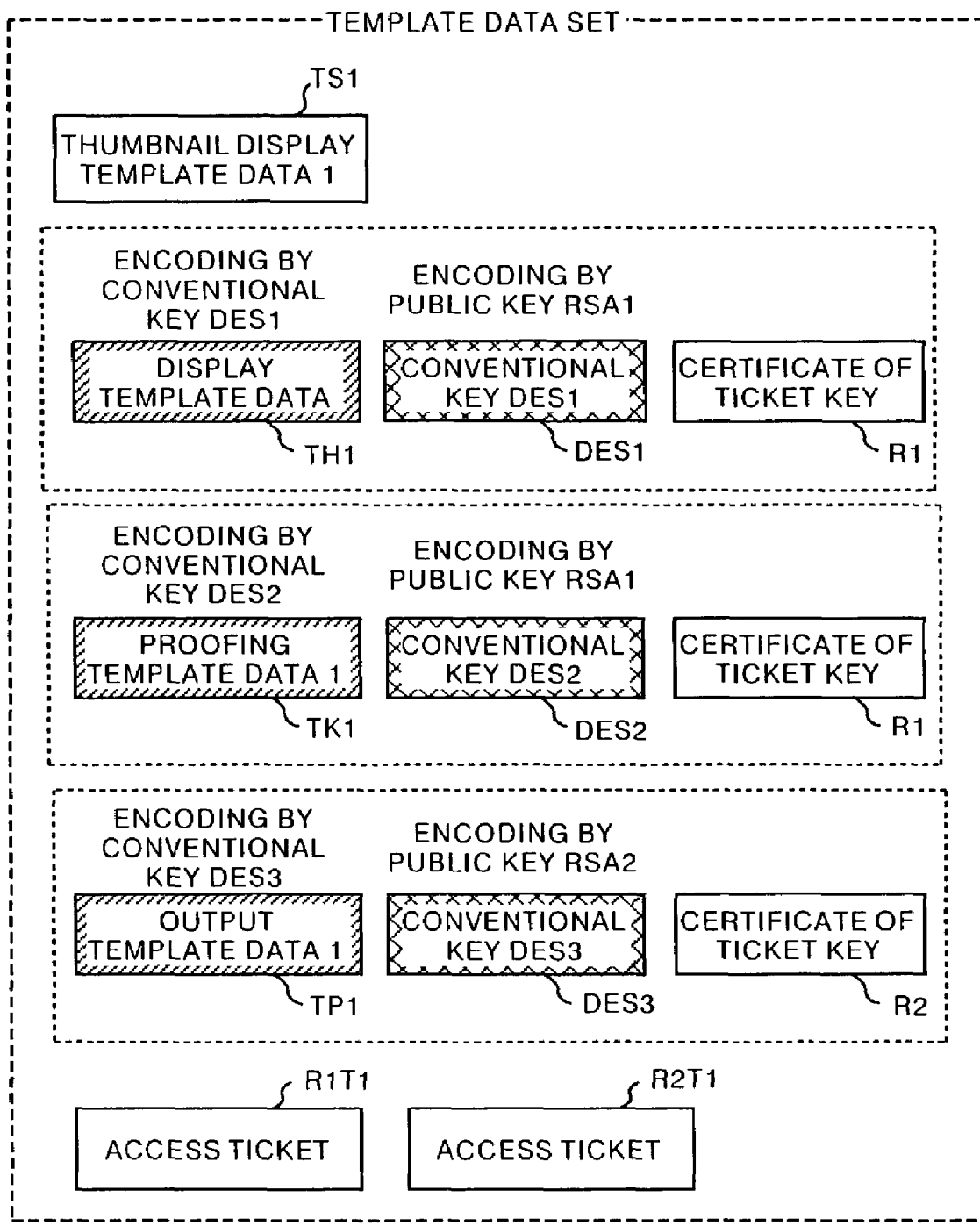
FIG. 3 shows an example of template data set.

The template data set will be described in detail with reference to FIG. 3, hereinbelow. As shown in FIG. 3, the template data set comprises a thumbnail display template data TS1, a display template data assembly comprising display template data TH1 encoded by a common key (conventional key) DES1, the common key DES1 encoded by a public key RSA1 and a certificate of ticket key R1, a proofing template data assembly comprising proofing template data TK1 encoded by a common key DES2, the common key DES2 encoded by a public key RSA1 and a certificate of ticket key R1, and an output template data assembly comprising output template data TP1 encoded by a common key DES3, the common key DES3 encoded by a public key RSA2 and a certificate of ticket key R1.

The thumbnail display template TS1 is for displaying templates in a reduced scale on the user terminal 11, for instance, when the user 1 selects one or more of the templates. The display template data TH1 is for displaying templates on the user terminal 11, for instance, for edit, and is combined with suitable letters, e.g., sample. The proofing template data TK1 is for printing templates by the user terminal 11 for proofing, and is combined with suitable letters, e.g., sample. The output template data TP1 is for use as output data on the basis of which the service shop 2 prints. The certificate of ticket key R1 is data which is attached to data encoded by the public key RSA1 to denote that the data is encoded by the public key RSA1. The certificate of ticket key R2 is data which is attached to data encoded by the public key RSA2 to denote that the data is encoded by the public key RSA2.

Figure 4:
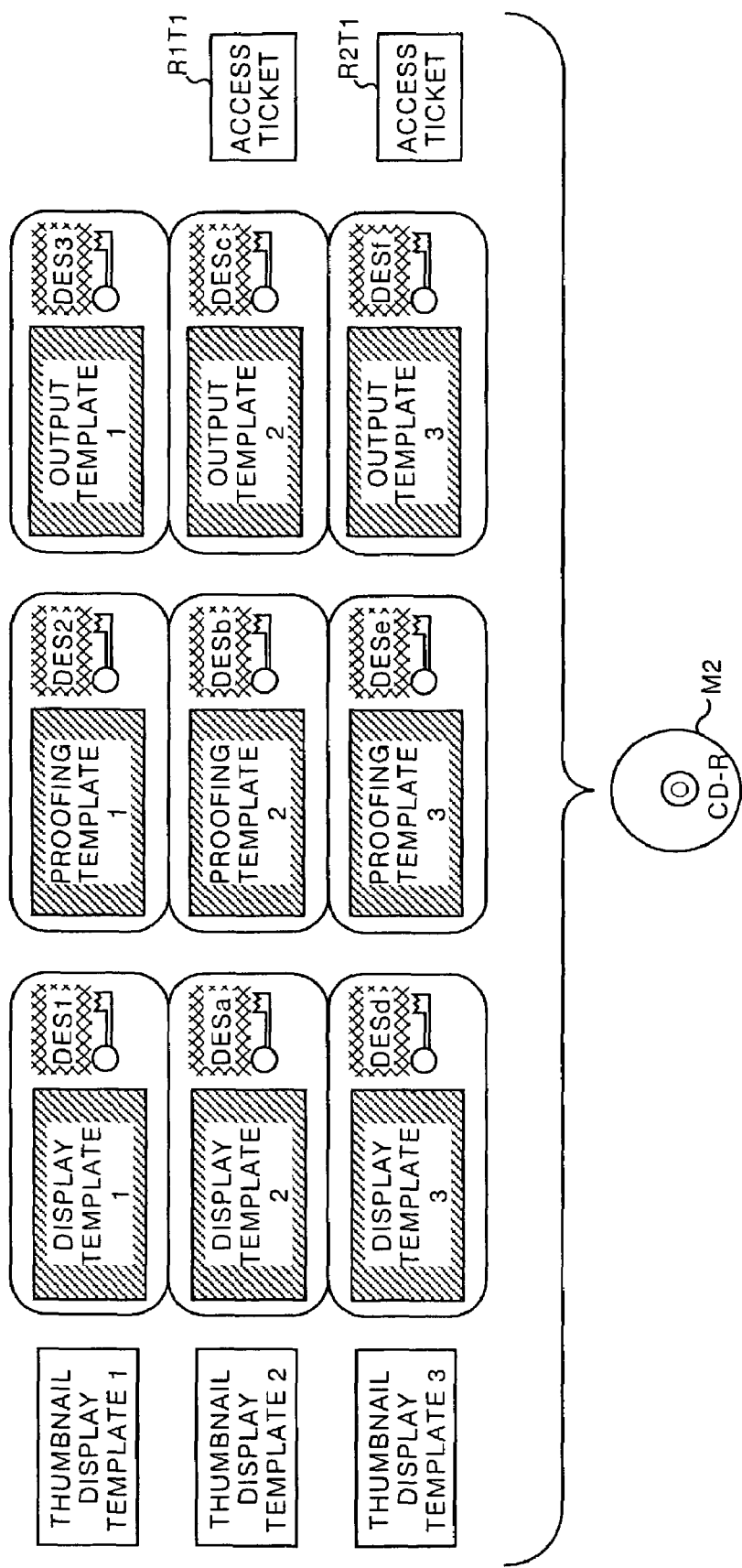
FIG. 4 is a view for illustrating a CD-R on which the template data set and the like are recorded.
Figure 5:
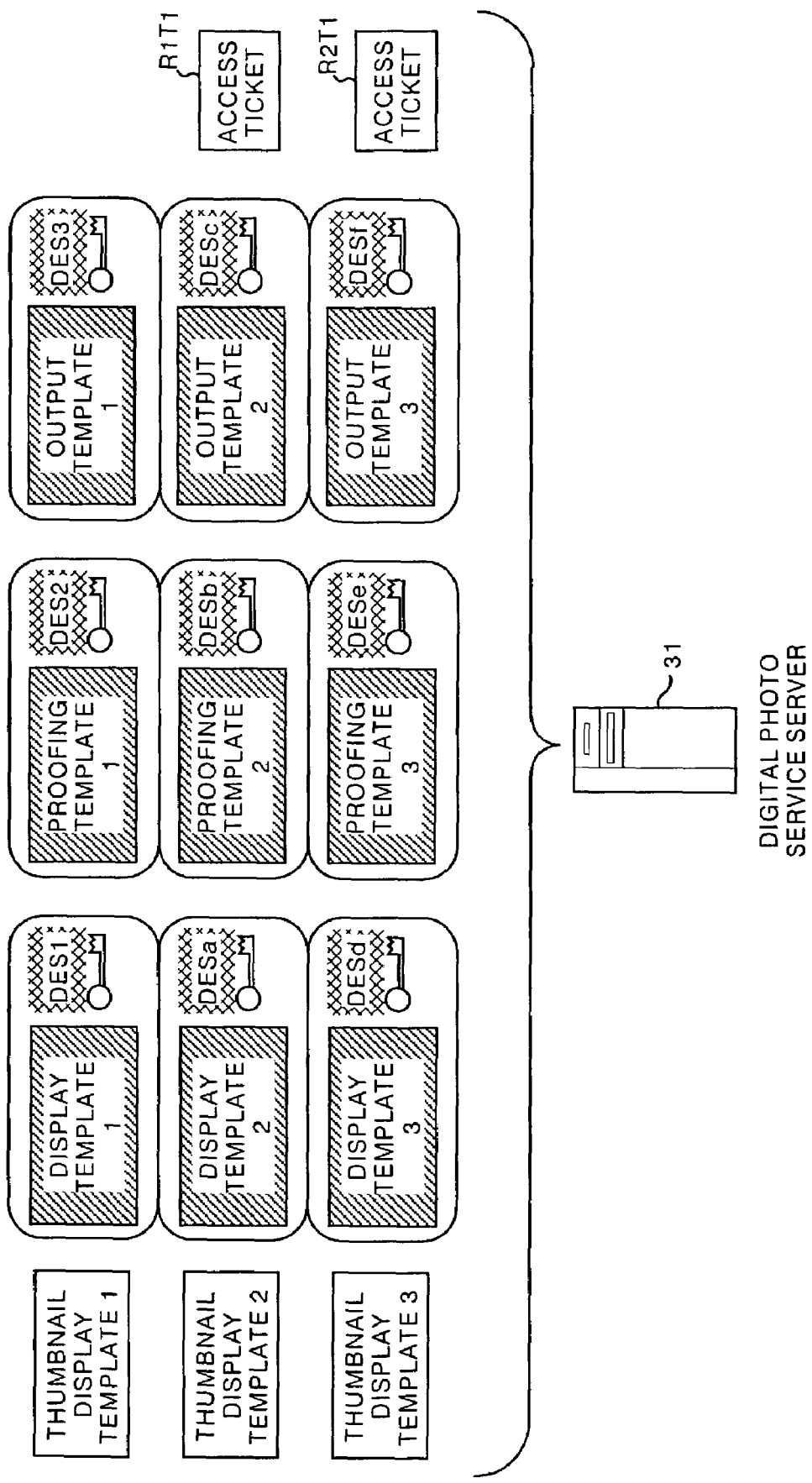
FIG. 5 is a view for illustrating a digital photo service server on which the template data set and the like are recorded.

When the template data set is to be delivered to the user 1 by distributing a recording medium such as a CD-ROM to the user 1, a plurality of template data sets together with a low resolution data access ticket R1T1 and a high resolution data access ticket R2T2 are recorded on the recording medium as shown in FIG. 4. When the template data set is to be delivered to the user 1 by way of a network, a plurality of template data sets together with a low resolution data access ticket R1T1 and a high resolution data access ticket R2T2 are loaded in the digital photo service server 31 as shown in FIG. 5, and the digital photo service server 31 sends one or more template data sets as requested by the user 1 together with the low resolution data access ticket R1T1 and the high resolution data access ticket R2T2.

The low resolution data access ticket R1T1 functions as a personal key for decoding data encoded by the public key RAS1 and the high resolution data access ticket R2T1 functions as a personal key for decoding data encoded by the public key RAS2. The access tickets R1T1 and R2T1 can function as a personal key only when they are combined with a particular token. Further, the access tickets R1T1 and R2T1 may be provided with time limit information so that they are available until the time limit.

Figure 6:
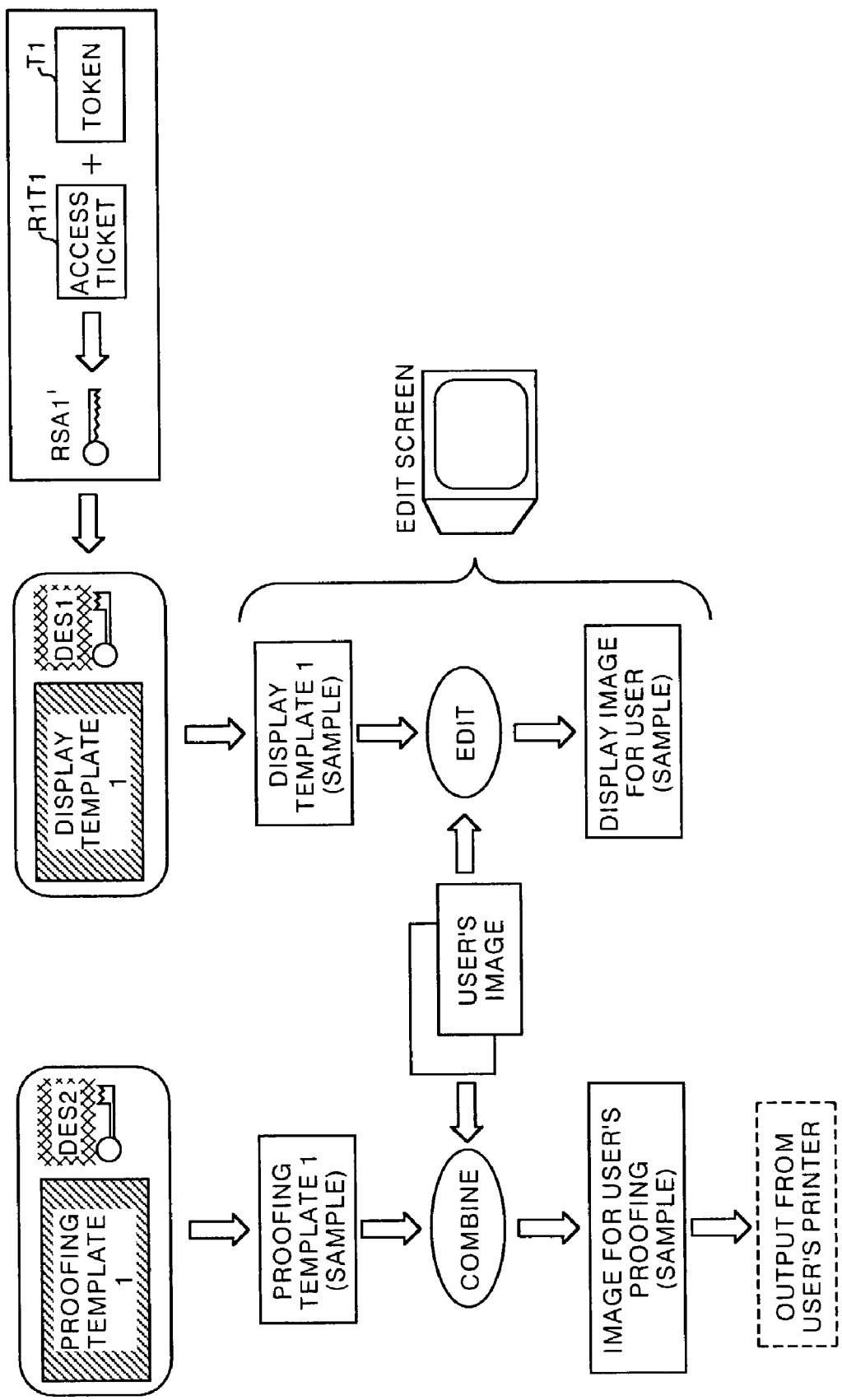
FIG. 6 is a view for illustrating the editing processing to be executed on the user terminal.

Editing processing on the user terminal 11 will be described with reference to FIG. 6, hereinbelow. The display template data TH1 and the proofing template data TK1 are decoded in the user terminal 11. The decoding will be described in detail, hereinbelow.

The low resolution data access ticket R1T1 which has been delivered to the user 1 can function as a personal key RSA1' for decoding data encoded by the public key RSA1 when combined with token T1 enclosed with the software.

The common key DES1 encoded by the public key RSA1 is decoded by the low resolution data access ticket R1T1 which functions as the personal key RSA1' corresponding to the public key RSA1 and the display template data TH1 encoded by the common key DES1 is decoded by the decoded common key DES1. Similarly, the common key DES2 encoded by the public key RSA1 is decoded by the low resolution data access ticket R1T1 and the proofing template data TK1 encoded by the common key DES2 is decoded by the decoded common key DES2.

The decoded display template data TH1 is displayed on an edit screen, and the user 1 combines the decoded display template data with the user's image data and makes combined image data. When the user 1 requests printing the combined image data, the proofing template data is combined with the user's image data in the same manner and image data for user's proofing is made. Then the image data for user's proofing is printed. Each pieces of the user's image data has a plurality of pieces of data different in resolution and data optimal in resolution to the corresponding template data is used when the user's image data is combined with the display template data or the proofing template data.

The combined image data may include one or more character strings combined with the display template data TH1 and the user's image data. Font of the character string is converted to bit map font from outline font in the user terminal 11.

The resolution of the bitmap data representing the character string is conformed to that of display template data or the proofing template data.

After the combined image data is made, an order screen is presented to the user 1.

Figure 7:
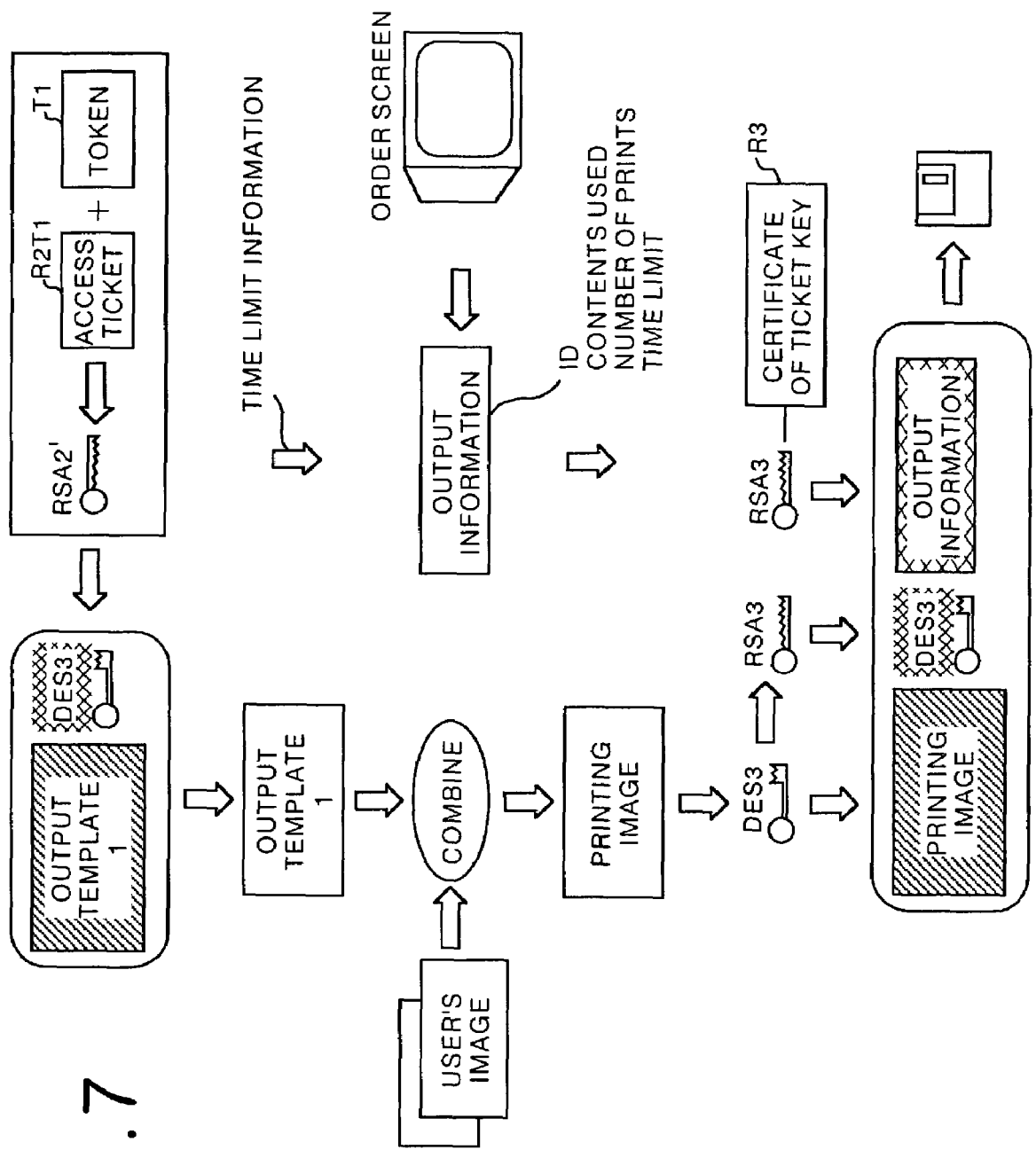
FIG. 7 is a view for illustrating the ordering processing to be executed on the user terminal.

Order processing on the user terminal 11 will be described with reference to FIG. 7, hereinbelow. The output template data TP1 is decoded in the user terminal 11. The decoding will be described in detail, hereinbelow.

The high resolution data access ticket R2T1 which has been delivered to the user 1 can function as a personal key RSA2' for decoding data encoded by the public key RSA2 when combined with token Ti enclosed with the software.

The common key DES3 encoded by the public key RSA2 is decoded by the high resolution data access ticket R2T1 which functions as the personal key RSA2' corresponding to the public key RSA2 and the output template data TP1 encoded by the common key DES3 is decoded by the decoded common key DES3. The template data TP1 is processed so that the decoded output template data TP1 cannot be used by the user 1.

In the order screen, the user 1 inputs the number of prints for each combined image data, and makes output information representing his or her ID, the kind of template data used, the number of prints, the time limit of output attached to the high resolution data access ticket R2T1 and the like.

The decoded output template data is combined with the user's image data and output image data is made in the same manner as making the combined image data. User's image data optimal in resolution to the output template data TP1 is used at this time. When a character string is inserted into the output image data, the bit map data representing the character string is conformed to that of the output template data. The output image data thus made is encoded by the common key DES3. Further, the common key DES3 and the output information are encoded by the public key RSA3 enclosed with the software.

The output data encoded by the common key DES3, the common key DES3 encoded by the public key RSA3 and the output information and the certificate of ticket key R3 which are encoded by the public key RSA3 are encapsulated and recorded on a recording medium like an FD.

An order is completed when the user 1 transfers the recording medium to the service shop 2.

Figure 8:
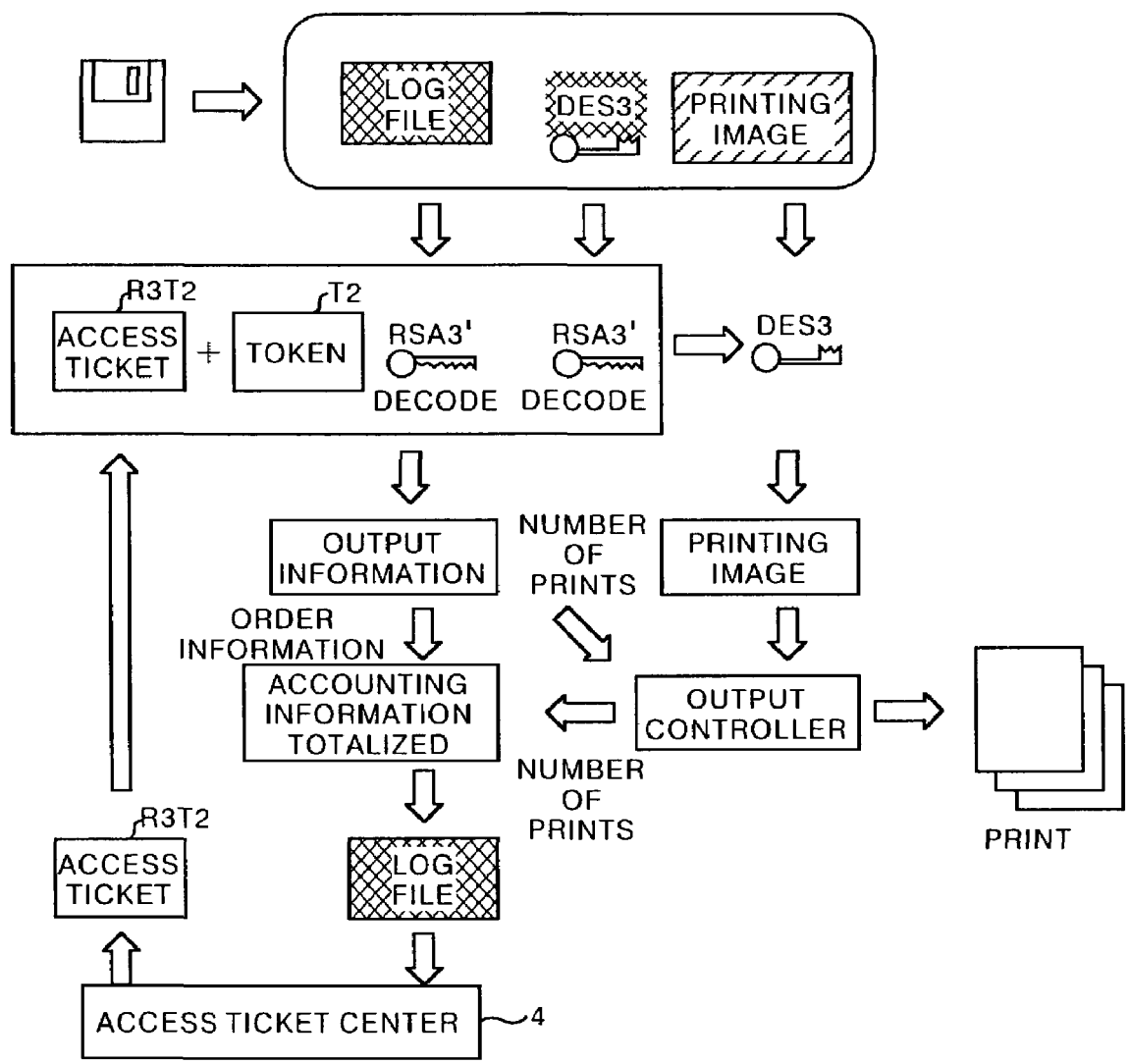
FIG. 8 is a view for illustrating the processing to be executed by the service shop and the access ticket center.
Figure 9:
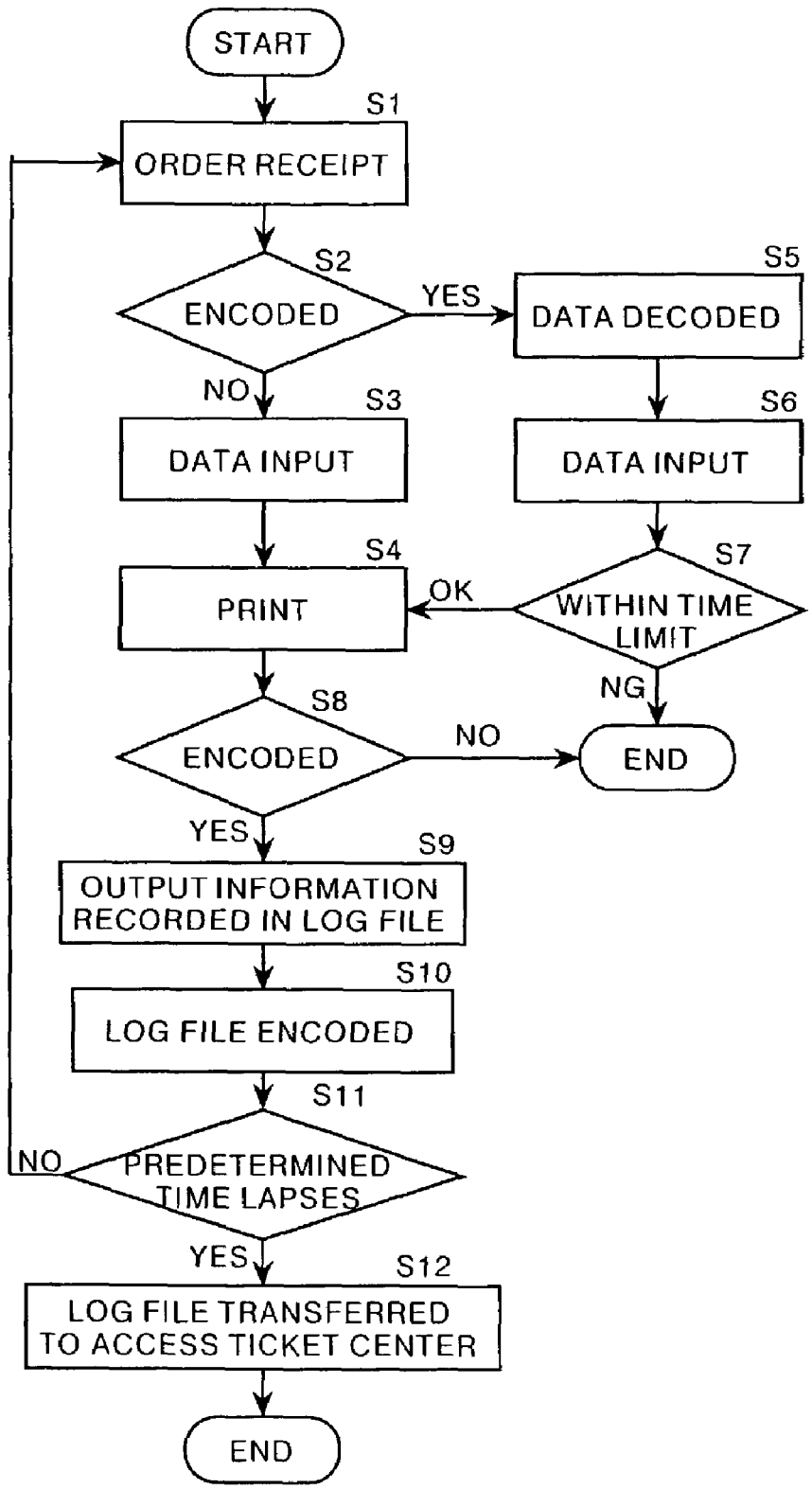
FIG. 9 is a flow chart for illustrating the processing to be executed by the service shop.

The processing to be executed in the service shop will be described with reference to FIGS. 8 and 9, hereinbelow.

The service shop 2 first receives the recording medium (e.g., FD) which the user 1 takes in and receives the order for prints. (step S1 in FIG. 9) When the data recorded on the recording medium has not been encoded, the data is input into the printer as it is and the data is printed. (steps S2, S3, S4, S8) Then the processing is ended.

When the data recorded on the recording medium has been encoded, the data is decoded. (steps S2 and S5) The decoding will be described in detail, hereinbelow. The output data access ticket R3T2 which has been delivered to the user 1 can function as a personal key RSA3' for decoding data encoded by the public key RSA3 when combined with token T2. The common key DES3 and the output information encoded by the public key RSA3 are decoded by the output data access ticket R3T2 which functions as the personal key RSA3' and the output data encoded by the common key DES3 is decoded by the decoded common key DES3.

An available period (output time limit) has been set on the output data access ticket R3T2, and output data access tickets R3T2 available for a next predetermined period are periodically issued from the access ticket center to be described later.

Then the output data is input into the printer 22 (step S6) and it is determined whether the available period of the output data access ticket R3T2 has expired (step S7). When the available period of the output data access ticket R3T2 has expired, the processing ended without printing. When the available period of the output data access ticket R3T2 has not expired, the output data is printed. (step S4)

When the output data encoded by the output data access ticket R3T2 is printed, the kind of the template data, the number of ordered prints, the number of prints output from the service shop 2 are stored in the log file (step S9) and the log file is encoded by a predetermined means (step S10).

The processing described above is repeated each time the service shop 2 receives an order for prints, and the service shop 2 transfers the log file to the accounting server 4 every predetermined time. (steps S11 and S12)

Figure 10:
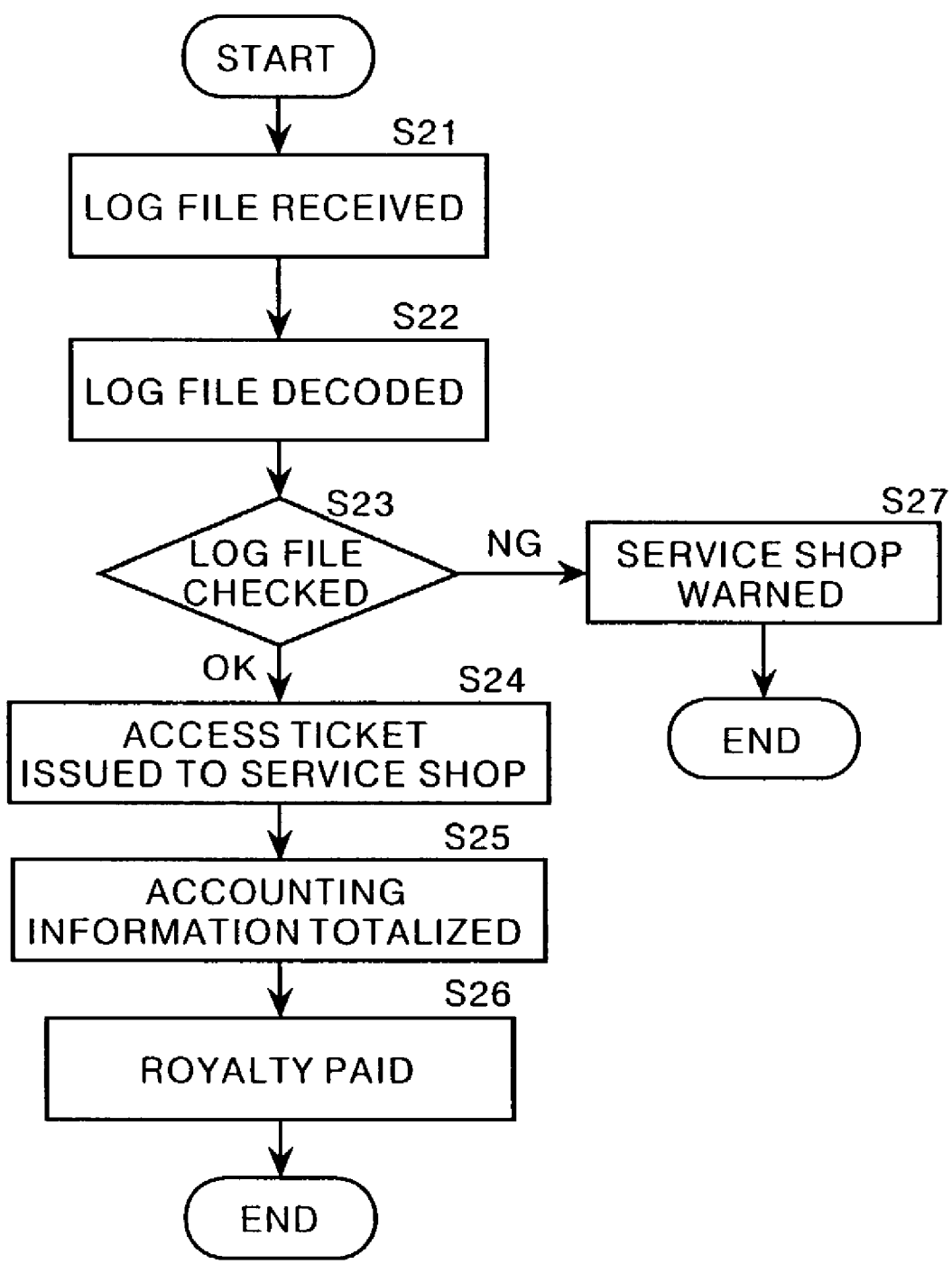
FIG. 10 is a flow chart for illustrating the processing to be executed by the access ticket center.

The processing executed by the accounting server 4 will be described with reference to the flow chart shown in FIG. 10, hereinbelow.

Upon receipt of a log file from the service shop 2 (step S21), the accounting server 4 decodes the log file (step S22) and checks the contents thereof (step S23). When there is a great difference between the number of prints the user 1 ordered and the number of the prints the service shop 2 outputs, the accounting server 4 warns the service shop 2 of the fact. (step S27) When it is determined that the contents of the log file includes no irregularity, the accounting server 4 requests the access ticket center 5 to issue output data access tickets R3T2 with an updated available period to the service shop 2. (step S24)

Further, the accounting server 4 totalizes the output number by the templates on the basis of the accounting information in the log file (step S25), charges the service shops for the number of prints of each template data, and pays royalty for the template data (step S26).

As can be understood from the description above, in the system in accordance with the first embodiment of the present invention described above, the user 1 is caused to make an order for prints by using only the display template data and the proofing template data out of the template set delivered to the user 1, an illegal use and a drain on the high quality output template can be prevented. Further, by making accounting according to the number of prints made by the service shop 2, the copyright royalty can be properly collected.

A second embodiment of the present invention will be described, hereinbelow. The network photo service system of the second embodiment is the same in components as the first embodiment and differs from the first embodiment only in the operation of a part of the components. Accordingly, only the difference from the first embodiment will be described, hereinbelow.

The second embodiment differs from the first embodiment in that the high resolution data access ticket R2T1 is not distributed to the user 1, the output template data TP1 is not decoded in the ordering processing, and the output data is made by the service shop with the high resolution data access ticket R2T1 distributed to the service shop 2.

The operation of the system of the second embodiment will be described, hereinbelow. First the user 1 prepares user's image data. The software for combining the user's image data and template data, the template data set and the low resolution data access ticket R1T1 are sent to the user 1.

Then the display template data TH1 and the proofing template data TK1 are decoded on the user terminal 11 and the combined image data is made on the edit screen.

In the order screen, the user 1 inputs the number of prints for each combined image data, and makes output information representing his or her ID, the number of prints, and the like.

Then in the service shop 2, combination information on the basis of which the user's image data is to be combined with the output template data is made. The combination information includes, for instance, information representing the kind of the template to be combined with the user's image data, the layout of images, the sizes of the images, and the letters to be input.

The output template data TP1 encoded by the common key DES3, the common key DES3 and the certificate of ticket key R3 encoded by the public key RSA2, user's image data, the output information and the combination information are encapsulated and recorded on a recording medium like an FD.

An order is completed when the user 1 transfers the recording medium to the service shop 2.

The service shop 2 decodes the output template data TP1 and makes output data by combining the decoded output template data TP1 with the user's image data on the basis of the combination information. Then the output data is printed.

In the system in accordance with the second embodiment of the present invention, an effect similar to that obtained in the system of the first embodiment of the present invention can be obtained and at the same time, security is further enhanced as compared with the system in accordance with the first embodiment of the present invention since the output template data TP1 is not decoded on the user terminal 11.

A third embodiment of the present invention will be described, hereinbelow. The network photo service system of the third embodiment is the same in components as the second embodiment and differs from the second embodiment only in the operation of a part of the components. Accordingly, only the difference from the second embodiment will be described, hereinbelow.

The third embodiment differs from the second embodiment in that the output template data TP1 of the template data set, the common key DES3 encoded by the public key RSA2 and the certificate of ticket key R2 are distributed not to the user 1 but to the service shop 2.

In the system in accordance with the third embodiment of the present invention, an effect similar to that obtained in the system of the first embodiment of the present invention can be obtained and at the same time, security is further enhanced as compared with the system in accordance with the first or second embodiment of the present invention since the output template data TP1 is not distributed to the user 1.

A fourth embodiment of the present invention will be described, hereinbelow. The network photo service system of the fourth embodiment is the same in components as the first embodiment and differs from the first embodiment only in the operation of a part of the components. Accordingly, only the difference from the first embodiment will be described, hereinbelow.

The fourth embodiment differs from the first embodiment in that the template data set, the low resolution data access ticket R1T1 and the high resolution data access ticket R2T1 are not distributed to the user 1, and the processing executed by the user terminal in the first embodiment is executed by the digital photo service server 31 with which the user terminal 11 is connected by way of a network.

In the fourth embodiment, a Web screen for making an order for prints is displayed on the user terminal 11 on the basis of information such as the HTML file, Java® Script stored in the digital photo service server 31. On the Web screen, the user 1 is caused to upload the user's image data to the server 31 and to make combined image data by combining the user's image data with template data selected from the plurality of pieces of template data stored in the digital photo service server 31.

The output data encoded by the common key DES3, the common key DES3 encoded by the public key RSA3, and the output information and the certificate of ticket key R3 encoded by the public key RSA3 are encapsulated and these encapsulated data pieces are transferred from the digital photo service center to the service shop 2.

In the system in accordance with the fourth embodiment of the present invention, an effect similar to that obtained in the system of the first embodiment of the present invention can be obtained and at the same time, security is further enhanced as compared with the system in accordance with the first or second embodiment of the present invention since the output template data TP1 is not distributed to the user 1.

Though several embodiments of the present invention have been described below, the present invention need not be limited to the illustrated embodiments but the embodiments described above may be variously modified.

For example, it is possible to make accounting when the user gets the digital contents, it is possible to make the digital contents able to be printed only on printing paper exclusive to the digital contents in the service shop and to charge the user for the printing paper, or it is possible to charge the user on the basis of printing papers on which the digital contents are printed in advance. In these cases, accounting made on the service shop according to the number of prints becomes unnecessary.

Further, it is possible to use a plurality of digital contents in one combined image and to pay the copyright royalty to the respective copyrighters after printing.

What is claimed is:

1. A system for receiving orders for prints of user's image data combined with the high resolution contents of a digital contents set from a user holding the user's image data, in which:

the digital contents set comprises encoded low-resolution digital contents obtained by encoding low-resolution digital contents by a first public key, and encoded high-resolution digital contents obtained by encoding high-resolution digital contents by a second public key;

the digital contents set, a first personal key corresponding to the first public key, a second personal key corresponding to the second public key and a third public key are distributed to users;

a third personal key corresponding to the third public key is distributed to a service shop for printing the digital contents;

a user terminal, to be used by a user to make an order for prints, makes combined image data by combining the user's image data with the low resolution digital contents decoded by the first personal key;

the user terminal is caused to make encoded output data by encoding by the third public key output data obtained by combining the user's image data with the high resolution digital contents decoded by the second personal key in the same manner as in making the combined image data;

the user transfers the encoded output data as well as an order for prints to the service shop; and the service shop prints the output data encoded by the third personal key.

2. A system for receiving orders for prints of user's image data combined with the high resolution contents of a digital contents set from a user holding the user's image data, in which:

the digital contents set comprises encoded low-resolution digital contents obtained by encoding low-resolution digital contents by a first common key, a first encoded common key obtained by encoding the first common key by a first public key, encoded high-resolution digital contents obtained by encoding high-resolution digital contents by a second common key and a second encoded common key obtained by encoding the second common key by a second public key;

the digital contents set, a first personal key corresponding to the first public key, a second personal key corresponding to the second public key and a third public key are distributed to users;

a third personal key corresponding to the third public key is distributed to a service shop for printing the digital contents;

a user terminal, to be used by a user to make an order for prints, makes combined image data by combining the user's image data with the low resolution digital contents decoded by the first personal key;

the user terminal is caused to make encoded output data by encoding by the third public key output data obtained by combining the user's image data with the high resolution digital contents decoded by the second personal key in the same manner as in making the combined image data;

the user transfers the encoded output data as well as an order for prints to the service shop; and the service shop prints the output data encoded by the third personal key.

3. A system for receiving orders for prints of user's image data combined with the high resolution contents of a digital contents set from a user holding the user's image data, in which:

the digital contents set comprises encoded low-resolution digital contents obtained by encoding low-resolution digital contents by a first common key, a first encoded common key obtained by encoding the first common key by a first public key, encoded high-resolution digital contents obtained by encoding high-resolution digital contents by a second common key and a second encoded common key obtained by encoding the second common key by a second public key;

the digital contents set, and a first personal key corresponding to the first public key are distributed to users;

a second personal key corresponding to the second public key is distributed to a service shop for printing the digital contents, a user terminal, to be used by a user to make an order for prints, makes combined image data by combining the user's image data with the low resolution digital contents decoded by the first personal key;

the user terminal is caused to make combination information, on the basis of which the high resolution digital contents are to be combined with the user's image data, on the basis of making the combined image data;

the user transfers the user's image data, the encoded high resolution digital contents and the combination information as well as an order for prints to the service shop; and the service shop makes output data by combining the user's image data with the high resolution digital contents decoded by the second personal key on the basis of the combination information and prints the output data thus made.

4. A system for receiving orders for prints of user's image data combined with the high resolution contents of a digital contents set from a user holding the user's image data, in which:

the digital contents set comprises encoded low-resolution digital contents obtained by encoding low-resolution digital contents by a first common key, a first encoded common key obtained by encoding the first common key by a first public key, encoded high-resolution digital contents obtained by encoding high-resolution digital contents by a second common key and a second encoded common key obtained by encoding the second common key by a second public key;

the encoded low resolution digital contents of the digital contents set and a first personal key corresponding to the first public key are distributed to users;

the encoded high resolution digital contents of the digital contents set and a second personal key corresponding to the second public key are distributed to a service shop for printing the digital contents;

a user terminal, to be used by a user to make an order for prints, makes combined image data by combining the user's image data with the low resolution digital contents decoded by the first personal key;

the user terminal is caused to make combination information, on the basis of which the high resolution digital contents are to be combined with the user's image data, on the basis of making the combined image data;

the user transfers the user's image data and the combination information as well as an order for prints to the service shop; and the service shop makes output data by combining the user's image data with the high resolution digital contents decoded by the second personal key on the basis of the combination information and prints the output data thus made.

5. A system for receiving orders for prints of user's image data combined with the high resolution contents of a digital contents set from a user holding the user's image data, in which:

the digital contents set comprises encoded low-resolution digital contents obtained by encoding low-resolution digital contents by a first common key, a first encoded common key obtained by encoding the first common key by a first public key, encoded high-resolution digital contents obtained by encoding high-resolution digital contents by a second common key and a second encoded common key obtained by encoding the second common key by a second public key;

a third personal key corresponding to a third public key is distributed to a service shop for printing the digital contents;

a user terminal, to be used by a user to make an order for prints, is connected by way of a network to an order receipt server which has been provided with the digital contents set, a first personal key corresponding to the first public key, a second personal key corresponding to the second public key, and a third public key and transfers the user's image data to the order receipt server;

the order receipt server displays, on the user terminal of the user, the low resolution digital contents decoded by the first personal key, causes the user to send to the server combination information on the basis of which the high resolution digital contents are to be combined with the user's image data, viewing a display on his or her user terminal representing the decoded low resolution digital contents, and makes combined image data by combining the user's image data with the decoded low resolution digital contents according to the combination information;

the user sends an order for prints to the order receipt server viewing the combined image data displayed on his or her user terminal;

the order receipt server makes output data by combining the user's image data with the high resolution digital contents decoded by the second personal key on the basis of the combination information and the order for prints and transfers the output data encoded by the third public key to the service shop; and the service shop prints the output data decoded by the third personal key.

6. A system as defined in claim 1 or claim 2 in which at least one of the first personal key, the second personal key and the third personal key is arranged to be available only for a limited time.

7. A system as defined in claim 1 or claim 2 in which at least one of the first personal key, the second personal key and the third personal key is arranged to be available only when used in combination with an ID data for identifying the user's hardware or software.

8. A system as defined in claim 1 or claim 2 in which accounting is made on the service shop on the basis of the number of the high resolution digital contents or the output data printed in the service shop.

9. A system as defined in claim 1 or claim 2 in which accounting is made on the user each time the user gets the digital contents set.

10. A system for receiving orders for prints of user's image data combined with the high resolution contents of a digital contents set from a user holding the user's image data, in which:

the digital contents set comprises encoded low-resolution digital contents obtained by encoding low-resolution digital contents by a first public key, and encoded high-resolution digital contents obtained by encoding high-resolution digital contents by a second public key;

the digital contents set, and a first personal key corresponding to the first public key are distributed to users;

a second personal key corresponding to the second public key is distributed to a service shop for printing the digital contents, a user terminal, to be used by a user to make an order for prints, makes combined image data by combining the user's image data with the low resolution digital contents decoded by the first personal key;

the user terminal is caused to make combination information, on the basis of which the high resolution digital contents are to be combined with the user's image data, on the basis of making the combined image data;

the user transfers the user's image data, the encoded high resolution digital contents and the combination information as well as an order for prints to the service shop; and the service shop makes output data by combining the user's image data with the high resolution digital contents decoded by the second personal key on the basis of the combination information and prints the output data thus made.

11. A system as defined in claim 10 or claim 3 in which at least one of the first personal key, the second personal key and the third personal key is arranged to be available only for a limited time.

12. A system as defined in claim 10 or claim 3 in which at least one of the first personal key, the second personal key and the third personal key is arranged to be available only when used in combination with an ID data for identifying the user's hardware or software.

13. A system as defined in claim 10 or claim 3 in which accounting is made on the service shop on the basis of the number of the high resolution digital contents or the output data printed in the service shop.

14. A system as defined in claim 10 or claim 3 in which accounting is made on the user each time the user gets the digital contents set.

15. A system for receiving orders for prints of user's image data combined with the high resolution contents of a digital contents set from a user holding the user's image data, in which:

the digital contents set comprises encoded low-resolution digital contents obtained by encoding low-resolution digital contents by a first public key, and encoded high-resolution digital contents obtained by encoding high-resolution digital contents by a second public key;

the encoded low resolution digital contents of the digital contents set and a first personal key corresponding to the first public key are distributed to users;

the encoded high resolution digital contents of the digital contents set and a second personal key corresponding to the second public key are distributed to a service shop for printing the digital contents;

a user terminal, to be used by a user to make an order for prints, makes combined image data by combining the user's image data with the low resolution digital contents decoded by the first personal key;

the user terminal is caused to make combination information, on the basis of which the high resolution digital contents are to be combined with the user's image data, on the basis of making the combined image data;

the user transfers the user's image data and the combination information as well as an order for prints to the service shop; and the service shop makes output data by combining the user's image data with the high resolution digital contents decoded by the second personal key on the basis of the combination information and prints the output data thus made.

16. A system as defined in claim 15 or claim 4 in which at least one of the first personal key, the second personal key and the third personal key is arranged to be available only for a limited time.

17. A system as defined in claim 15 or claim 4 in which at least one of the first personal key, the second personal key and the third personal key is arranged to be available only when used in combination with an ID data for identifying the user's hardware or software.

18. A system as defined in claim 15 or claim 4 in which accounting is made on the service shop on the basis of the number of the high resolution digital contents or the output data printed in the service shop.

19. A system as defined in claim 15 or claim 4 in which accounting is made on the user each time the user gets the digital contents set.

20. A system for receiving orders for prints of user's image data combined with the high resolution contents of a digital contents set from a user holding the user's image data, in which:

the digital contents set comprises encoded low-resolution digital contents obtained by encoding low-resolution digital contents by a first public key, and encoded high-resolution digital contents obtained by encoding high-resolution digital contents by a second public key;

a third personal key corresponding to a third public key is distributed to a service shop for printing the digital contents;

a user terminal, to be used by a user to make an order for prints, is connected by way of a network to an order receipt server which has been provided with the digital contents set, a first personal key corresponding to the first public key, a second personal key corresponding to the second public key, and a third public key and transfers the user's image data to the order receipt server;

the order receipt server displays, on the user terminal of the user, the low resolution digital contents decoded by the first personal key, causes the user to send to the server combination information on the basis of which the high resolution digital contents are to be combined with the user's image data, viewing a display on his or her user terminal representing the decoded low resolution digital contents, and makes combined image data by combining the user's image data with the decoded low resolution digital contents according to the combination information;

the user sends an order for prints to the order receipt server viewing the combined image data displayed on his or her user terminal;

the order receipt server makes output data by combining the user's image data with the high resolution digital contents decoded by the second personal key on the basis of the combination information and the order for prints and transfers the output data encoded by the third public key to the service shop; and the service shop prints the output data decoded by the third personal key.

21. A system as defined in claim 20 or claim 5 in which at least one of the first personal key, the second personal key and the third personal key is arranged to be available only for a limited time.

22. A system as defined in claim 20 or claim 5 in which at least one of the first personal key, the second personal key and the third personal key is arranged to be available only when used in combination with an ID data for identifying the user's hardware or software.

23. A system as defined in claim 20 or claim 5 in which accounting is made on the service shop on the basis of the number of the high resolution digital contents or the output data printed in the service shop.

24. A system as defined in claim 20 or claim 5 in which accounting is made on the user each time the user gets the digital contents set.

* * * * *